United States Patent
Chen et al.

(10) Patent No.: US 12,110,234 B2
(45) Date of Patent: Oct. 8, 2024

(54) POLYCRYSTALLINE 18H HEXAFERRITE, METHOD OF MANUFACTURE, AND USES THEREOF

(71) Applicant: ROGERS CORPORATION, Chandler, AZ (US)

(72) Inventors: Yajie Chen, Andover, MA (US); Qifan Li, Malden, MA (US)

(73) Assignee: ROGERS CORPORATION, Chandler, AZ (US)

( * ) Notice: Subject to any disclaimer, the term of this patent is extended or adjusted under 35 U.S.C. 154(b) by 731 days.

(21) Appl. No.: 17/171,104

(22) Filed: Feb. 9, 2021

(65) Prior Publication Data

US 2021/0246046 A1    Aug. 12, 2021

Related U.S. Application Data

(60) Provisional application No. 62/972,116, filed on Feb. 10, 2020.

(51) Int. Cl.
| | | |
|---|---|---|
| *C01G 49/00* | (2006.01) | |
| *C08L 57/00* | (2006.01) | |
| *C08L 87/00* | (2006.01) | |
| *C08K 3/22* | (2006.01) | |

(52) U.S. Cl.
CPC .......... *C01G 49/0063* (2013.01); *C08L 57/00* (2013.01); *C08L 87/00* (2013.01); *C08K 2003/2265* (2013.01)

(58) Field of Classification Search
CPC ...... C01G 49/0063; C08L 57/00; C08L 87/00
See application file for complete search history.

(56) References Cited

U.S. PATENT DOCUMENTS

| | | |
|---|---|---|
| 3,461,072 A | 8/1969 | Winkler |
| 4,664,831 A | 5/1987 | Hibst et al. |
| 5,452,167 A | 9/1995 | Nago |
| 5,616,414 A | 4/1997 | Hopstock et al. |
| 8,263,224 B2 | 9/2012 | Tokiwa |
| 10,468,169 B2 | 11/2019 | Chen et al. |
| 10,766,786 B2 | 9/2020 | Chen et al. |
| 11,004,583 B2 | 5/2021 | Chen et al. |
| 2002/0050309 A1 | 5/2002 | Marusawa |
| 2003/0052298 A1 | 3/2003 | Wang et al. |
| 2003/0091841 A1 | 5/2003 | Marusawa |
| 2009/0297432 A1 | 12/2009 | Hill |
| 2012/0229354 A1 | 9/2012 | Ishikura et al. |
| 2013/0292602 A1 | 11/2013 | Hill |
| 2014/0291571 A1 | 10/2014 | Riden |
| 2017/0213628 A1 | 7/2017 | Chen et al. |
| 2018/0016157 A1 | 1/2018 | Chen et al. |
| 2019/0264005 A1 | 8/2019 | Horn et al. |
| 2021/0020343 A1 | 1/2021 | Chen et al. |
| 2021/0032121 A1 | 2/2021 | Li et al. |
| 2021/0043346 A1 | 2/2021 | Li et al. |
| 2021/0065943 A1 | 3/2021 | Zhang et al. |
| 2021/0179442 A1 | 6/2021 | Chen et al. |
| 2021/0261433 A1 | 8/2021 | Chen et al. |
| 2022/0367093 A1 | 11/2022 | Chen et al. |
| 2022/0367094 A1 | 11/2022 | Chen et al. |
| 2023/0352221 A1 | 11/2023 | Chen et al. |
| 2023/0352222 A1 | 11/2023 | Chen et al. |
| 2023/0352223 A1 | 11/2023 | Chen et al. |
| 2023/0399237 A1 | 12/2023 | Chen et al. |

FOREIGN PATENT DOCUMENTS

| | | |
|---|---|---|
| CN | 101723654 A | 6/2010 |
| CN | 103304186 A | 9/2013 |
| CN | 104193224 A | 12/2014 |
| CN | 104379537 A | 2/2015 |
| CN | 108475568 A | 8/2018 |
| DE | 3907220 | 9/1990 |
| EP | 2028663 A1 | 2/2009 |
| EP | 2784044 A1 | 10/2014 |
| EP | 3012843 A1 | 4/2016 |
| JP | 62216922 A | 9/1987 |
| JP | H02120237 A | 5/1990 |
| JP | H05101930 A | 4/1993 |
| JP | H06338410 A | 12/1994 |
| JP | 2009105365 A | 5/2009 |
| JP | 2017037999 A | 2/2017 |
| WO | 2011081399 A2 | 7/2011 |

(Continued)

OTHER PUBLICATIONS

Watanabe et al., J. Phys. Soc. Japan, (2020), v.89, 014704 (published Dec. 13, 2019).*
Tauber et al., J. Phys. Soc. Japan, (1971), 42(4), p. 1738-1740.*
Tauber et al., J. of Applied Physics, (1971), 42(4), p. 1738-1740. (Listed in IDS).*
Watanabe et al. J. Phys. Soc. Japan, (2020), v.89, 014704 (published Dec. 13, 2019). (Listed in IDS).*
Faouri et al., "High quality factor cold sintered Li2MoO4-BaFe12O19 composites for microwave applications," Mar. 2019, Acta Materialia, vol. 166, pp. 202-207.
Li, Qifan, et al. "Emerging magnetodielectric materials for 5G communications: 18H hexaferrites," Acta Materialia 231 (2022) 117854 Elsevier Ltd., 10 pages.

(Continued)

*Primary Examiner* — Yong L Chu

(74) *Attorney, Agent, or Firm* — CANTOR COLBURN LLP

(57) ABSTRACT

A polycrystalline ferrite composition comprises a formula of $M_5Me_2Ti_3Fe_{12}O_{31}$, wherein M is $Ba^{2+}$, $Sr^{2+}$, or a combination thereof; and Me is $Mg^{2+}$, $Zn^{2+}$, $Cu^{2+}$, $Co^{2+}$, or a combination thereof; and has an average grain size of 1 micrometer to 100 micrometers. A composite comprises a polymer matrix; and the polycrystalline ferrite composition. Methods of making the polycrystalline ferrite composition and the composite are also disclosed.

25 Claims, 5 Drawing Sheets

(56) References Cited

FOREIGN PATENT DOCUMENTS

| WO | 2012103020 A2 | 8/2012 |
|---|---|---|
| WO | 2016064459 A2 | 4/2016 |
| WO | 2016123598 A1 | 8/2016 |
| WO | 2020162295 A1 | 8/2020 |
| WO | 2021061599 A1 | 4/2021 |
| WO | 2021162886 A1 | 8/2021 |

OTHER PUBLICATIONS

Aoyama et al.; "Preparation and Characterization of Z-type Hexaferrites, Ba3(1-x)Sr3xCo2Fe24O41 with x=0-0.5, via a two-step calcination with an intermediate wet milling"; J.Electroceram; 17; pp. 61-64 (2006).

Cao et al. "Hydrogen-Induced Lateral Growth of Nickel Coating on Ba3Co2Fe24O4 (Co2Z -Based Hexaferrite during the Electroplating of Multilayer Chip Inductors," Journal of The Electrochemical Society, 2002, vol. 149 Issue 12, pp. J89-J92.

Haijun et al., "The preparation and microwave properties of Ba3ZnzCo2-zFe24O41 ferrite by citrate sol-gel process", Materials Science and Engineering, B84, 2001, pp. 252-257.

Li et al. "High-frequency magnetic properties of W-type barium-ferrite BaZn2-xCoxFe16O27 composites", Journal of Applied Physics 94, 5918 (2003): https://doi.org/10.1063/1.1618945.

Li, Jie, et al. "Structural and magnetic properties of M-Ti (M = Ni or Zn) co-substituted M-type barium ferrite by a novel sintering process," Journal of Materials Science: Materials in Electronics. Chapman and Hall, London, GB; vol. 26; No. 2; Nov. 15, 2014, pp. 1060-1065.

Lui, Chaocheng, et al. "Characterizations of magnetic transition behavior and electromagnetic properties of Co-Ti co- substituted SrM-based hexaferrites SrCoxTixFe12-2xO19 compounds," Journal of Alloys and Compounds, vol. 784, Jan. 11, 2019, pp. 1175-1186.

Mahmood, Sami H., et al. "Modification of the Magnetic Properties of Co$_2$Y Hexaferrites by Divalent and Trivalent Metal Substitutions," Solid State Phenomena, vol. 241; Oct. 2015, pp. 93-125.

Pullar, Robert C. "Hexagonal Ferrites: A Review of the synthesis, properties and application of hexaferrite ceramics," Mar. 2012, Progress in Material Science, vol. 57, No. 7, pp. 1191-1334.

Su et el., "Low Loss Factor Co2Z Ferrite Composites with Equivalent Permittivity and Permeability for Ultra-high Frequency Applications," Applied Physics Letters, Aug. 2014, vol. 105 No. 062402.

International Search Report; International Application No. PCT/2021/016133; International Filing Date: Feb. 2, 2021; Date of Mailing: May 20, 2020; 5 pages.

Watanabe Kazuya et al., "Discovery of the New Crystallographic Phase of an Exotic Magnetic Oxide: 118H-type lexaferrite," Journal of the physical society of Japan, Jan. 15, 2020, vol. 89, No. 1, p. 014704.

Written Opinion; International Application No. PCT/2021/016133; International Filing Date: Feb. 2, 2021; Date of Mailing: May 20, 2020; 5 pages.

Baker-Jarvis, J. et al., "Measuring the Permittivity and Permeability of Lossy Materials: Solids, Liquids, Metals, Building Materials, and Negative-Index Materials", NIST Technical Note 1536, US Government Printing Office, Washington, DC, Feb. 2005; 160 pages.

Kohn, J.A. et al., "Cell, Symmetry and Basic Structure of a New Ferrimagnet, Ba5An2Ti3Fe12O31" Mat. Res. Bull. vol. 6; pp. 743-748.

Savage, R. O. et al., "Magnetic Properties of Single Crystal CuNi-18H and MgZn-18H Solid Solutions", AIP Conference Proceedings (1975). vol. 24, pp. 491-492, doi.org/10.1063/1.29974.

Tauber, A. et al., "Magnetic Properties of a Unique 18-Layer Hexagonal Ferrite", Journal of Applied Physics 42, 1738 (1971); https://doi.org/10.1063/1.1660419; Published Online: Dec. 19, 2003; 4 pages; https://doi.org/10.1063/1.1660419.

Tauber, A. et al., "Magnetic Properties of Single Crystal Ba5Me2Ti3Fe12O31, ME=Co, Cu", AIP Conference Proceedings (1972) 5(1):1547-1551 ; https://doi.org/10.1063/1.2953911.

Li, Qifan. Development of Magnetodielectric Materials with Low Loss and High Snoek's Product for Microwave Applications, Ph.D. Dissertation to The Department of Electrical and Computer Engineering, Northeastern Univ., Boston, MA, Dec. 2020, 150 pgs.

You, Jae-Hyoung, et al. Magnetic Properties of Zn-substituted Y-type hexaferrites, Ba2ZnxFe2-xFe12O22, Journal of Magnetism and Magnetic Materials, 471 (2019) 255-261.

\* cited by examiner

POLYCRYSTALLINE 18H HEXAFERRITE, METHOD OF MANUFACTURE, AND USES THEREOF

CROSS-REFERENCE TO RELATED APPLICATION

This application claims the benefit of U.S. Provisional Patent Application Ser. No. 62/972,116 filed Feb. 10, 2020, which is incorporated by reference in its entirety herein.

BACKGROUND

This disclosure relates generally to polycrystalline 18H hexaferrite compositions, particularly with high frequency magnetic permeability, composites comprising the polycrystalline 18H hexaferrite compositions, methods of manufacture, and uses thereof.

Improved performance and miniaturization are needed to meet the ever-increasing demands of devices used in ultra-high frequency (UHF), L-band, and S-band applications, which are of particular interest in a variety of commercial and defense related industries. As an important component in radar and modern wireless communication systems, antenna elements with compact size are constantly being developed. It has, however, been challenging to develop ferrite materials for use in such high frequency applications as most ferrite materials exhibit relatively high magnetic loss at high frequencies. The method of making ferrite materials can impact the crystalline structure of the materials, thus improving performance.

There accordingly remains a need for ferrite materials that are of low magnetic loss, high magnetic permeability, and low dielectric constant and dielectric loss in the gigahertz range, and methods of making the ferrite materials.

BRIEF SUMMARY

A polycrystalline ferrite composition has a formula of $M_5Me_2Ti_3Fe_{12}O_{31}$, wherein M is $Ba^{2+}$, $Sr^{2+}$, or a combination thereof; and Me is $Mg^{2+}$, $Zn^{2+}$, $Cu^{2+}$, $Co^{2+}$, or a combination thereof; and has an average grain size of 1 micrometer to 100 micrometers.

A method of manufacturing the polycrystalline ferrite composition comprises calcining blended metal source compounds for the polycrystalline ferrite composition; reducing particle size of the calcined source compounds to obtain particles having an average particle size of 0.5 micrometer to 10 micrometers; granulating a mixture of the particles and a binder to obtain granules; compressing granules into a green body; and sintering the green body to form the polycrystalline ferrite composition.

A composite comprises: a polymer matrix; and the polycrystalline ferrite composition.

A method of making the composite comprises: combining a polymer, the polycrystalline ferrite composition, optionally a solvent, and optionally an additive composition to form the composite; and optionally removing the solvent from the composite.

Articles comprising the polycrystalline ferrite composition or composite are also described, including an antenna, an inductor, a transformer, or an anti-electromagnetic interference material.

BRIEF DESCRIPTION OF THE DRAWINGS

The following Figures are exemplary embodiments, which are provided to illustrate the present disclosure. The figures are illustrative of the examples, which are not intended to limit devices made in accordance with the disclosure to the materials, conditions, or process parameters set forth herein.

DETAILED DESCRIPTION

Figure 1:
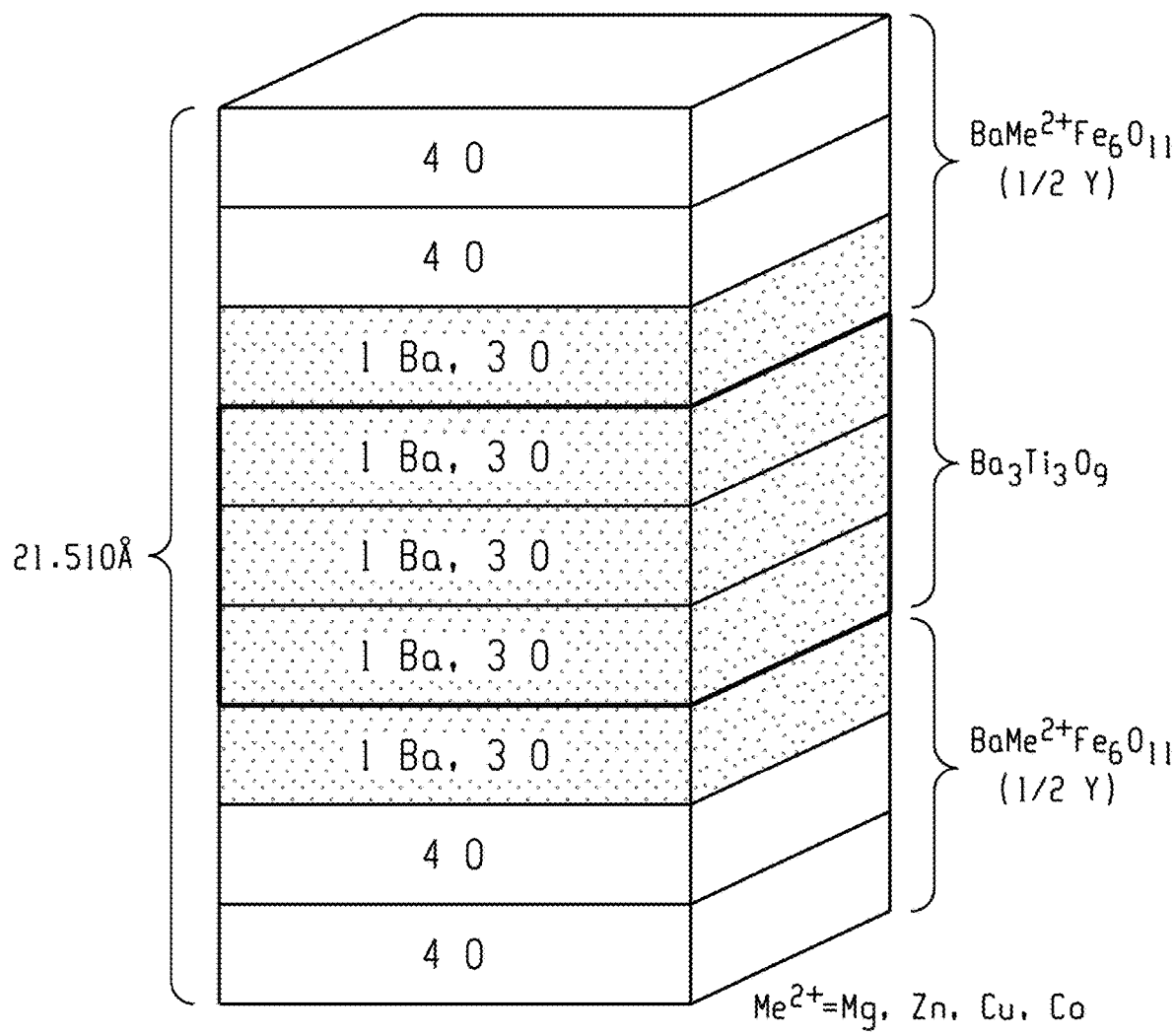
FIG. 1 presents a schematic diagram of one-half of the 18-layer stacking sequence for the unit cell of the 18H hexaferrite $Ba_5Ti_3Me_2Fe_{12}O_{31}$ showing 3 layers of half Y block, 3 layers of hexagonal barium titanate (HBT) and 3 layers of half Y block. Actual distribution of interstitial cations may differ in order to provide path for magnetic coupling along c-axis. HBT layer may also contain Fe ion or/and Me=Mg, Zn, Co, Cu.

It was discovered that polycrystalline 18H-type ferrite compositions having an average grain size of 1 micrometer to 100 micrometers have a low magnetic loss tangent and high magnetic permeability at high frequency, while also exhibiting a low dielectric loss tangent and high permittivity. Advantageously, the polycrystalline 18H-type ferrite compositions are cost-effective to prepare since they require no expensive elements, such as rare earth or noble elements. When compounded with a polymer, the ferrite compositions provide composites having low magnetic loss, high magnetic permeability, low dielectric constant, and low dielectric loss. The ferrite compositions and composites described herein are particularly useful in applications such as antenna substrates, inductor cores, and EMI suppressors over a wide range of frequency (0.5-10 GHz).

A polycrystalline ferrite composition has a formula of $M_5Me_2Ti_3Fe_{12}O_{31}$, wherein M is $Ba^{2+}$, $Sr^{2+}$, or a combination thereof; and Me is $Mg^{2+}$, $Zn^{2+}$, $Cu^{2+}$, $Co^{2+}$, or a combination thereof. The polycrystalline ferrite composition can have an 18H-type structure. The polycrystalline ferrite composition can have in-plane (basal c-plane) easy magnetization (also called planar anisotropy).

Grain size of the polycrystalline ferrite composition is selected to provide the polycrystalline ferrite composition with magneto-dielectric properties suitable for a given application. Grain size can be controlled by control of ferrite synthesis conditions, for example the temperature, time of heating, and rate of heating or cooling. The average grain size of the ferrite composition can be 1 micrometer to 100 micrometers, preferably 5 micrometers to 50 micrometers. Average grain size can be determined, for example, by X-ray diffractometry (XRD), scanning electron microscopy (SEM), transmission electron microscopy (TEM), or a combination thereof.

The polycrystalline ferrite composition can have a formula of $$(Ba_{1-x}Sr_x)_5Mg_{2-y}Me'_yTi_3Fe_{12-z}O_{31},$$

wherein Me' is $Zn^{2+}$, $Cu^{2+}$, $Co^{2+}$, or a combination thereof, x=0 to 1.5, y=0 to 1.8, and z=−4 to +4. Ferrite compositions of this formula advantageously show a super low loss in combination with a unique resonance peak. In certain compositions, y=0 to 1.0 and/or x=0.

In certain aspects the polycrystalline ferrite composition can exclude ferrites of formula $Ba_5Zn_2Ti_3Fe_{12}O_{31}$, $Ba_5Mg_2Ti_3Fe_{12}O_{31}$, $Ba_5Co_2Ti_3Fe_{12}O_{31}$, $Ba_5Cu_2Ti_3Fe_{12}O_{31}$, $Ba_{5.1}(Ni_{1.1}Cu_{0.4})Ti_{2.7}Fe_{12.3}Mn_{0.4}O_{31}]$, or $Ba_{5.4}(Mg_{1.3}Zn_{0.7})Ti_{2.9}Fe_{11.7}O_{31}$.

The polycrystalline ferrite composition can have a magnetic permeability ($\varphi$ of at least 2 at a frequency of 1 to 4 GHz, preferably at least 5 at a frequency of 1 to 4 GHz; a magnetic loss tangent (tan $\delta_\mu$) of less than 0.05 at a frequency of 1 to 4 GHz, preferably of less than 0.02 at a frequency of 1 to 4 GHz, more preferably while retaining high permeability of at least 2 at the frequency; a permittivity ($\varepsilon$) of at least 13 to 16 at a frequency of 1 to 4 GHz, preferably at least 13 to 15 at a frequency of 1 to 4 GHz; a dielectric loss tangent (tan $\delta_\varepsilon$) of less than 0.004 at a frequency of 1 to 3 GHz, preferably less than 0.003 at a frequency of 1 to 6 GHz; a magnetic loss factor (tan $\delta_\mu/\mu'$) less than 0.02 at a frequency of 1 to 4 GHz, or at a frequency of 2 to 6 GHz; a cutoff frequency (resonance frequency, $f_r$) greater than 4 GHz, preferably greater than 6 GHz; a Snoek product greater than 9 GHz, preferably greater than 12 GHz, wherein the Snoek product=$\mu' \times f_r$; or a combination of the foregoing.

The polycrystalline hexaferrite particles can be manufactured by any suitable method. Examples of methods of manufacturing the polycrystalline ferrite composition include a one-step sintering ceramic process and a wet-chemical process. Another example of a method of manufacturing the polycrystalline ferrite composition can comprise calcining blended metal source compounds for a desired polycrystalline ferrite composition; reducing particle size of the calcined source compounds to obtain particles having an average particle size of 0.5 micrometer to 10 micrometers; granulating a mixture of the particles and a binder to obtain granules; compressing granules into a green body; and sintering the green body to form the polycrystalline ferrite composition.

A metal source compound is a compound needed for synthesis of a ferrite. The metal source compounds can be selected based on factors such as cost and availability. Exemplary source compounds for a given metal include oxides, carbonates, acetates, nitrates, sulfates, or chlorides of the metal. Exemplary precursors include a barium carbonate (for example, $BaCO_3$), an iron oxide (for example, $\alpha$-$Fe_2O_3$), a magnesium oxide (for example, MgO), a titanium oxide (for example $TiO_2$), and a zinc oxide (for example, ZnO). Additional iron precursors include $Fe(NO_3)_3 \cdot 9H_2O$, $FeCl_3 \cdot 6H_2O$, $Fe_2(SO_4)_3 \cdot H_2O$; possible cobalt precursors include a cobalt oxide ($Co_3O_4$), $Co(CH_3COO)_2 \cdot 4H_2O$, $Co(NO_3)_2 \cdot 6H_2O$, $CoCl_2 \cdot 6H_2O$; and additional zinc precursors include $Zn(NO_3)_2 \cdot 6H_2O$, $ZnCl_2$, $ZnSO_4 \cdot 7H_2O$. The metal source compounds can be combined in amounts to achieve the desired metal stoichiometry.

Calcining the blended metal source compounds can be performed at a suitable temperature for a length of time to synthesize the desired ferrite and achieve a desired grain size. For example, the temperature can be 800° C. to 1300° C., or 900° C. to 1200° C., or 1000° C. to 1200° C. The length of time can be, for example 0.5 hour to 200 hours, or 1 hour to 15 hours. Calcining is performed in an atmosphere of air, nitrogen, oxygen, or a combination thereof. The heating rate or the cooling rate for calcining in a furnace can also be selected to obtain a desired ferrite, grain size, or structural morphology. For example, the heating rate or the cooling rate can be 2 to 3° C./minute.

Reducing particle size of the calcined blend can be performed by any suitable method. Examples of methods to reduce particle size include crushing, grinding, milling, mechanical milling, and a combination thereof. Examples of devices to reduce particle size include a media mill, ball mill, two-roll mill, three-roll mill, bead mill, air-jet mill, and a cryogenic grinder. After reducing the particle size, the particles can be subjected to a sizing procedure, such as sieving, to alter the particle size distribution.

Granulating a mixture of the ferrite particles and a binder can be performed by any suitable method, for example by a spray-drying granulation method or an oscillating extrusion granulating method. For example, a slurry of the ferrite particles, binder, and various additives as desired can be dispersed in a solvent, such as water, and then the slurry can be spray-dried with a spray dryer or the like to produce granules. Alternatively, ferrite particles, a binder, and various additives as required can be mixed and granulated with a stirring granulator to produce a granulated powder. This granulated powder can then be extruded and granulated with an oscillating granulator to produce granules.

The binder is selected to be removable from the green body by heating and optionally for solubility in a solvent. Examples of a binder include polyvinylpyrrolidone (PVP), poly(vinyl alcohol) (PVA), polyvinyl butyral (PVB), polyacrylamide (PAM), poly(acrylic acid) (PAA), polyethylene glycol (PEG), polyethylene oxide (PEO), cellulose acetate, starch, polypropylene carbonate, polyvinyl acetate (PVAc), and a combination thereof. Preferably, the binder is PVA, PVB, or a combination thereof.

The granulated ferrite composition is molded into a predetermined shape by various compression molding methods, for example, a single pressing method, a double pressing method, a floating die method, a withdrawal method, etc., to obtain a green body. The compression machine is appropriately selected depending on the selected size, shape, and quantity of green bodies, such as a mechanical press, a hydraulic press, or a servo press. The molding pressure for forming the green body can be 0.3-3 metric ton/centimeter squared ($MT/cm^2$), or 0.5-2 $MT/cm^2$.

The green body can then be sintered in a suitable atmosphere to form the polycrystalline ferrite composition. The sintering can occur at a sintering temperature of 800 to 1,300° C., 900 to 1,250° C., or 1,000 to 1,200° C. The sintering can occur for a sintering time of 1 to 20 hours, or 2.55 to 12 hours. The atmosphere can be air, nitrogen, oxygen, or a combination thereof. The sintering can be performed with a heating rate of 1° C./minute to 5° C./minute and/or with a cooling rate of 1° C./minute to 5° C./minute.

A composite can comprise the polycrystalline ferrite composition and a polymer matrix.

The composite can comprise 5 to 95 volume % (vol. %), 10 to 90 vol. %, 20 to 80 vol. %, or 30 to 70 vol. % of the polycrystalline ferrite composition based on the total volume of the composite. The composite can comprise 5 to 95 vol. %, 10 to 90 vol. %, 20 to 80 vol. %, or 30 to 70 vol. % of the polymer based on the total volume of the composite.

The 18H ferrite particles present in the composite have a particle size of 0.5 micrometer to 30 micrometers, preferably 1 micrometer to 10 micrometers. The particle size can be determined using a Horiba LA-910 laser light scattering PSD analyzer, or a comparable instrument, or as determined in accordance with ASTM D4464-15. The reported particle size is the median D50 particle size by volume. Appropriately sized 18H-type ferrite particles can be obtained by any suitable method. For example, any suitable ceramic process or chemical process can be used to synthesize the 18H ferrite particles of the desired size. Alternatively, the 18H-type ferrite particles can be obtained by crushing and grinding the sintered ferrite bulks obtained by the method described above.

The polymer matrix can comprise a thermoset or a thermoplastic polymer. As used herein, the term "thermoplastic" refers to a material that is plastic or deformable, melts to a liquid when heated, and freezes to a brittle, glassy state when cooled sufficiently. Examples of thermoplastic polymers that can be used include cyclic olefin polymers (including polynorbornenes and copolymers containing norbornenyl units, for example, copolymers of a cyclic polymer such as norbornene and an acyclic olefin such as ethylene or propylene), fluoropolymers (for example, polyvinyl fluoride (PVF), polyvinylidene fluoride (PVDF), fluorinated ethylene-propylene (FEP), polytetrafluoroethylene (PTFE), poly (ethylene-tetrafluoroethylene (PETFE), or perfluoroalkoxy (PFA)), polyacetals (for example, polyoxyethylene and polyoxymethylene), poly($C_{1-6}$ alkyl)acrylates, polyacrylamides (including unsubstituted and mono-N- or di-N-($C_{1-8}$ alkyl)acrylamides), polyacrylonitriles, polyamides (for example, aliphatic polyamides, polyphthalamides, or polyaramides), polyamideimides, polyanhydrides, polyarylene ethers (for example, polyphenylene ethers), polyarylene ether ketones (for example, polyether ether ketones (PEEK) and polyether ketone ketones (PEKK)), polyarylene ketones, polyarylene sulfides (for example, polyphenylene sulfides (PPS)), polyarylene sulfones (for example, polyethersulfones (PES), polyphenylene sulfones (PPS), and the like), polybenzothiazoles, polybenzoxazoles, polybenzimidazoles, polycarbonates (including homopolycarbonates or polycarbonate copolymers such as polycarbonate-siloxanes, polycarbonate-esters, or polycarbonate-ester-siloxanes), polyesters (for example, polyethylene terephthalates, polybutylene terephthalates, polyarylates, or polyester copolymers such as polyester-ethers), polyetherimides (for example, copolymers such as polyetherimide-siloxane copolymers), polyimides (for example, copolymers such as polyimide-siloxane copolymers), poly($C_{1-6}$ alkyl)methacrylates, polyalkylacrylamides (for example, unsubstituted and mono-N- or di-N-($C_{1-8}$ alkyl)acrylamides), polyolefins (for example, polyethylenes, such as high density polyethylene (HDPE), low density polyethylene (LDPE), and linear low density polyethylene (LLDPE), polypropylenes, and their halogenated derivatives (such as polytetrafluoroethylenes), and their copolymers, for example ethylene-alpha-olefin copolymers), polyoxadiazoles, polyoxymethylenes, polyphthalides, polysilazanes, polysiloxanes (silicones), polystyrenes (for example, copolymers such as acrylonitrile-butadiene-styrene (ABS) or methyl methacrylate-butadiene-styrene (MBS)), polysulfides, polysulfonamides, polysulfonates, polysulfones, polythioesters, polytriazines, polyureas, polyurethanes, vinyl polymers (for example, polyvinyl alcohols, polyvinyl esters, polyvinyl ethers, polyvinyl halides (for example, polyvinyl chloride), polyvinyl ketones, polyvinyl nitriles, or polyvinyl thioethers,), a paraffin wax, or the like. A combination comprising at least one of the foregoing thermoplastic polymers can be used.

Thermoset polymers are derived from thermosetting monomers or prepolymers (resins) that can irreversibly harden and become insoluble with polymerization or cure, which can be induced by heat or exposure to radiation (for example, ultraviolet light, visible light, infrared light, or electron beam (e-beam) radiation). Thermoset polymers include alkyds, bismaleimide polymers, bismaleimide triazine polymers, cyanate ester polymers, benzocyclobutene polymers, benzoxazine polymers, diallyl phthalate polymers, epoxies, hydroxymethylfuran polymers, melamine-formaldehyde polymers, phenolics (including phenol-formaldehyde polymers such as novolacs and resoles), benzoxazines, polydienes such as polybutadienes (including homopolymers and copolymers thereof, for example, poly (butadiene-isoprene)), polyisocyanates, polyureas, polyurethanes, triallyl cyanurate polymers, triallyl isocyanurate polymers, certain silicones, and polymerizable prepolymers (for example, prepolymers having ethylenic unsaturation, such as unsaturated polyesters, polyimides), or the like. The prepolymers can be polymerized, copolymerized, or cross-linked, for example, with a reactive monomer such as styrene, alpha-methylstyrene, vinyltoluene, chlorostyrene, acrylic acid, (meth)acrylic acid, a ($C_{1-6}$ alkyl)acrylate, a ($C_{1-6}$ alkyl) methacrylate, acrylonitrile, vinyl acetate, allyl acetate, triallyl cyanurate, triallyl isocyanurate, or acrylamide.

The polymer can comprise at least one of a fluoropolymer (for example, polyvinylidene fluoride (PVDF) or polytetrafluoroethylene (PTFE)), a polyolefin (for example, polyethylene (PE), high density polyethylene (HDPE), low density polyethylene (LDPE)), a poly(arylene ether ketone) (for example, polyether ether ketone (PEEK)), a poly alkyl (meth)acrylate (for example, polymethylmethacrylate (PMMA)), or a poly(ether sulfone).

The composite may include additional additives, such as dielectric fillers or flame retardants, so long as the additive are less than 5 vol. % of the total volume of the composite.

A particulate dielectric filler may be employed to adjust the dielectric constant, dissipation factor, coefficient of thermal expansion, and other properties of the composite. Exemplary dielectric fillers include titanium dioxide (rutile and anatase), barium titanate, strontium titanate, silica (including fused amorphous silica), corundum, wollastonite, $Ba_2Ti_9O_{20}$, solid glass spheres, synthetic glass or ceramic hollow spheres, quartz, boron nitride, aluminum nitride, silicon carbide, beryllia, alumina, alumina trihydrate, magnesia, mica, talcs, nanoclays, magnesium hydroxide, and combinations comprising at least one of the foregoing.

Flame retardants can be halogenated or unhalogenated. An exemplary inorganic flame retardant is a metal hydrate such as a hydrate of a metal such as Mg, Ca, Al, Fe, Zn, Ba, Cu, Ni, or a combination comprising at least one of the foregoing. Specific hydrates include aluminum hydroxide, magnesium hydroxide, calcium hydroxide, iron hydroxide, zinc hydroxide, copper hydroxide and nickel hydroxide; and hydrates of calcium aluminate, gypsum dihydrate, zinc borate and barium metaborate. Organic flame retardants can be used, alternatively or in addition to the inorganic flame retardants. Examples of inorganic flame retardants include melamine cyanurate, fine particle size melamine polyphosphate, various other phosphorus-containing compounds such as aromatic phosphinates, diphosphinates, phosphonates, and phosphates, certain polysilsesquioxanes, siloxanes, and halogenated compounds such as hexachloroendomethylenetetrahydrophthalic acid (HET acid), tetrabromophthalic acid and dibromoneopentyl glycol, for example.

The composite can have an operating frequency of 1 GHz to 10 GHz.

The composite can have a magnetic loss tangent (tan $\delta_\mu$) of less than 0.02 at a frequency of 1 to 8 GHz. Magnetic materials with such a low magnetic loss can advantageously be used in high frequency applications such as in antenna applications.

The composite can have a magnetic permeability ($\mu$) of at least 1.5 at a frequency of 1 to 10 GHz.

The composite can have a permittivity ($\varepsilon$) of 5 to 6 at a frequency of 1 to 10 GHz.

The composite can have a dielectric loss tangent (tan $\delta_\varepsilon$) of less than 0.004 at a frequency of 1 to 10 GHz.

The composite can have a magnetic loss factor (tan $\delta_\mu/\mu'$) less than 0.01, or 0.008 at a frequency of 1 to 8 GHz, or at a frequency of 2 to 10 GHz.

The composite can have a cutoff frequency (resonance frequency, $f_r$) greater than 8 GHz, preferably greater than 10 GHz.

A method of making a composite comprises combining a polymer, the polycrystalline ferrite composition, optionally a solvent, and any additives to form a composition. The polymer can be melted prior to or after combining with the polycrystalline ferrite composition. Optionally, the method further comprises removing the solvent. The combining can be by any suitable method, such as blending, mixing, or stirring. In an embodiment, the polymer is molten, and the polycrystalline ferrite composition and optional additives are dissolved or suspended in the molten polymer. In an embodiment, the components used to form the composite, including the polymer and the polycrystalline ferrite composition and the optional additives, can be combined by being dissolved or suspended in a solvent to provide a mixture or solution.

The solvent, when included, is selected so as to dissolve the polymer, disperse the polycrystalline ferrite composition and any other optional additives that can be present, and to have a convenient evaporation rate for forming and drying. A non-exclusive list of possible solvents is xylene; toluene; methyl ethyl ketone; methyl isobutyl ketone; hexane, and higher liquid linear alkanes, such as heptane, octane, nonane, and the like; cyclohexane; isophorone; various terpene-based solvents; and blended solvents. Specific exemplary solvents include xylene, toluene, methyl ethyl ketone, methyl isobutyl ketone, and hexane, and still more specifically xylene and toluene.

The concentration of the components of the composition in the solution or dispersion is not critical and will depend on the solubility of the components, the additive level used, the method of application, and other factors. In general, the solution comprises 10 to 80 weight percent solids (all components other than the solvent), more specifically 50 to 75 weight percent solids, based on the total weight of the solution.

Any solvent is allowed to evaporate under ambient conditions, or by forced or heated air, and the composition is cooled to provide a composite. The composition can also be shaped by known methods, for example extruding, molding, or casting.

The mixture can be molded, for example, by compression molding, injection molding, reaction injection molding, and the like to form the composite. The mixture can alternative be extruded or subjected to a rolling technique to form the composite.

The composite can be prepared by reaction injection molding a thermosetting composition. The reaction injection molding can comprise mixing at least two streams to form a thermosetting composition and injecting the thermosetting composition into the mold, wherein a first stream can comprise a catalyst and the second stream can comprise an activating agent. One or both of the first stream and the second stream or a third stream can comprise a monomer. One or both of the first stream and the second stream or a third stream can comprise at least one of a cross-linking agent, the polycrystalline ferrite composition, and an additive. One or both of the polycrystalline ferrite composition and the additive can be added to the mold prior to injecting the thermosetting composition.

The mixing can occur in a head space of an injection molding machine. The mixing can occur in an inline mixer. The mixing can occur during injecting into the mold. The mixing can occur at a temperature of greater than or equal to 0 to 200° C., or 15 to 130° C., or 0 to 45° C., or 23 to 45° C.

The mold can be maintained at a temperature of greater than or equal to 0 to 250° C., or 23 to 200° C., or 45 to 250° C., or 30 to 130° C., or 50 to 70° C. It can take 0.25 to 0.5 minutes to fill a mold, during which time, the mold temperature can drop. After the mold is filled, the temperature of the thermosetting composition can increase, for example, from a first temperature of 0° to 45° C. to a second temperature of 45 to 250° C. The molding can occur at a pressure of 65 to 350 kilopascal (kPa). The molding can occur for less than or equal to 5 minutes, or less than or equal to 2 minutes, or 2 to 30 seconds. After the polymerization is complete, the composite can be removed at the mold temperature or at a decreased mold temperature. For example, the release temperature, $T_r$, can be less than or equal to 10° C. less than the molding temperature, $T_m$ ($T_r \leq T_m - 10°$ C.).

After the composite is removed from the mold, it can be post-cured. Post-curing can occur at a temperature of 100 to 150° C., or 140 to 200° C. for greater than or equal to 5 minutes.

Also included herein are articles comprising the polycrystalline ferrite composition or the composite. The article can be a microwave device, such as an antenna or an inductor. The article can be a transformer, an inductor, or an anti-electromagnetic interference material. The article can be an antenna such as a patch antenna, an inverted-F antenna, or a planar inverted-F antenna. The article can be a magnetic bus bar, for example, for wireless charging; an NFC shielding material; or an electronic bandgap meta-material. The article can be for use in the frequency 0.1 to 4 gigahertz range, or in the 0.5 to 2 gigahertz range. The article can be used for a variety of devices operable within the ultrahigh frequency range, such as a high frequency or microwave antenna, filter, inductor, circulator, or phase shifter. The article can be operable at frequencies greater than or equal to 1 GHz, or at frequencies of 1 to 6 GHz. Such articles can be used in commercial and military applications, weather radar, scientific communications, wireless communications, autonomous vehicles, aircraft communications, space communications, satellite communications, or surveillance.

The following examples are provided to illustrate the present disclosure. The examples are merely illustrative and are not intended to limit the scope hereof.

EXAMPLE

A series of 18H hexaferrite compositions are made. Chemical formulas of the hexaferrites are shown in Table 1 below.

TABLE 1

Formulas of polycrystalline hexaferrite $Ba_5Mg_{2-x}Zn_xTi_3Fe_{12}O_{31}$

| Sample No. | x | Formulation |
|---|---|---|
| 1 | 0 | $Ba_5Mg_2Ti_3Fe_{11.7}O_{31}$ |
| 2 | 0.25 | $Ba_5Mg_{1.75}Zn_{0.25}Ti_3Fe_{11.7}O_{31}$ |
| 3 | 0.50 | $Ba_5Mg_{1.5}Zn_{0.5}Ti_3Fe_{11.7}O_{31}$ |
| 4 | 0.70 | $Ba_5Mg_{1.3}Zn_{0.7}Ti_3Fe_{11.7}O_{31}$ |
| 5 | 1.00 | $Ba_5Mg_1Zn_1Ti_3Fe_{11.7}O_{31}$ |
| 6 | 1.25 | $Ba_5Mg_{0.75}Zn_{1.25}Ti_3Fe_{11.7}O_{31}$ |
| 7 | 1.50 | $Ba_5Mg_{0.5}Zn_{1.5}Ti_3Fe_{11.7}O_{31}$ |
| 8 | 2.00 | $Ba_5Zn_2Ti_3Fe_{11.7}O_{31}$ |

Each of these eight hexaferrite compositions are made in general accordance with the procedure below.

The metal source compounds used are: $BaCO_3$ (>99.5%), MgO (>99.5%), ZnO (>99.5%), $TiO_2$ (>99.5%) and $Fe_2O_3$ (>99.2%).

The metal source compounds are blended together in a wet planetary mill in ratios to provide a desired formula.

The mixture of the metal source compounds are calcined by heating up to 1100 C for a soak time of 4 hours in air.

The calcined ferrite materials are then crushed and screened through a 40 #sieve. The sieved ferrite particles are then subjected to grinding in a wet planetary mill to achieve a size of 0.5-10 microns.

The fine ferrite particles are mixed with 0.5-5 weight percent (wt %) of polyvinyl alcohol (PVA) and then granulated into granules by sieving through a 40 #sieve.

The granules are compressed to form a ferrite green body under a pressure of 1 $MT/cm^2$. Green bodies of two different shapes are formed: a toroid (OD=7 mm, ID=3 mm, thickness=3-3.5 mm) for permeability and permittivity measurements or a disk (dia. 6 mm) for magnetic hysteresis measurements.

The PVA is first removed from the green bodies by heating at 600 C for 2 hrs in air followed by sintering the green bodies at 1150 C or 1250 C for 4 hrs in an atmosphere of oxygen to obtain the polycrystalline ferrite compositions. The oxygen gas flow rate is 0.5 L/min, the heating ramp rate is 3° C./min, and the cooling rate is 3° C./min. Sintering at the lower temperature produces a smaller grain size in the final ferrite composition compared to sintering at the higher temperature.

Magnetic hysteresis measurements are performed using a Vibrating Sample Magnetometer (VSM) at room temperature with applied field of 20 kOe.

Figure 2:
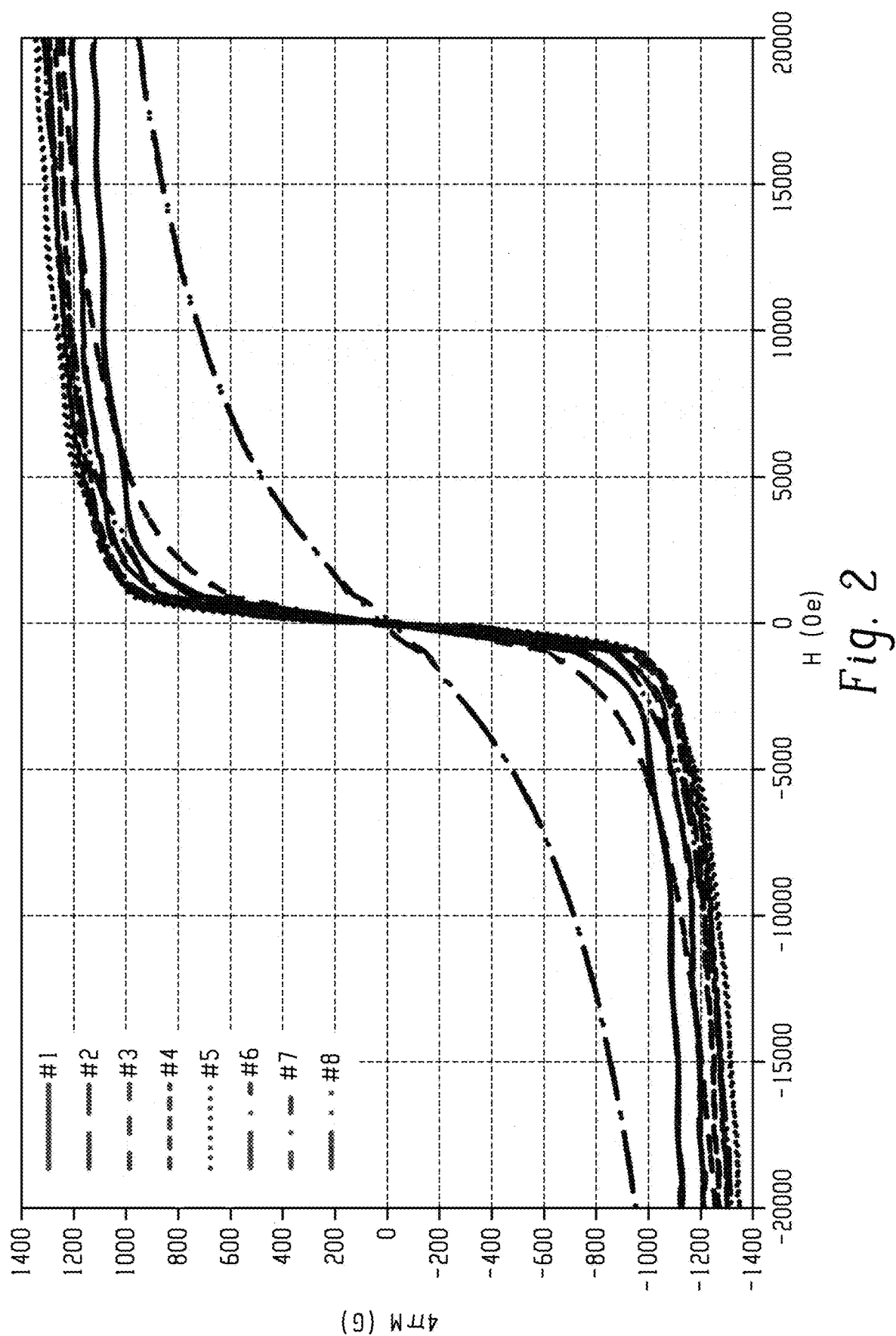
FIG. 2 presents a graph showing the magnetic hysteresis loop data for the exemplary polycrystalline ferrites $Ba_5Mg_{2-x}Zn_xTi_3Fe_{12}O_{31}$, with x varying from 0-2, disclosed in Table 1.

FIG. 2 shows the magnetic hysteresis loops determined for each of the 8 ferrite compositions of Table 1. Table 2 below tabulates the saturation magnetization and coercivity of each of the Table 1 ferrites compositions. It is observed that Zn dopant can maximize saturation magnetization (~1300-1350 G), especially at x=1.0-1.2, while leading to minimum coercivity of 14 Oe. This implies that Zn ion is indeed able to tailor intrinsic property of 18H ferrite such as magnetization, anisotropy field, etc.

TABLE 2

Saturation magnetization and coercivity of polycrystalline $Ba_5Mg_{2-x}Zn_xTi_3Fe_{12}O_{31}$ ferrites

| Sample No. | x | $4\pi Ms$ (G) | Hc (Oe) |
|---|---|---|---|
| 1 | 0 | 1122 | 67.7 |
| 2 | 0.25 | 1206 | 49.6 |
| 3 | 0.50 | 1262 | 42.6 |
| 4 | 0.70 | 1296 | 37.2 |
| 5 | 1.00 | 1345 | 34.3 |
| 6 | 1.25 | 1318 | 14.6 |
| 7 | 1.50 | 1245 | 38.6 |
| 8 | 2.00 | 954 | 128 |

Magnetic permeability/permittivity of the ferrite samples is measured in coaxial airline by vector network analyzer (VNA) in Nicholson-Ross-Weir (NRW) method over a frequency of 0.1-10 GHz. See Baker-Jarvis, J. et al. "Measuring the Permittivity and Permeability of Lossy Materials: Solids, Liquids, Metals, Building Materials, and Negative-index Materials", National Institute of Standards and Technology Technical Note 1536, 172 pages (February 2005), U.S. Government Printing Office.

Figure 3:
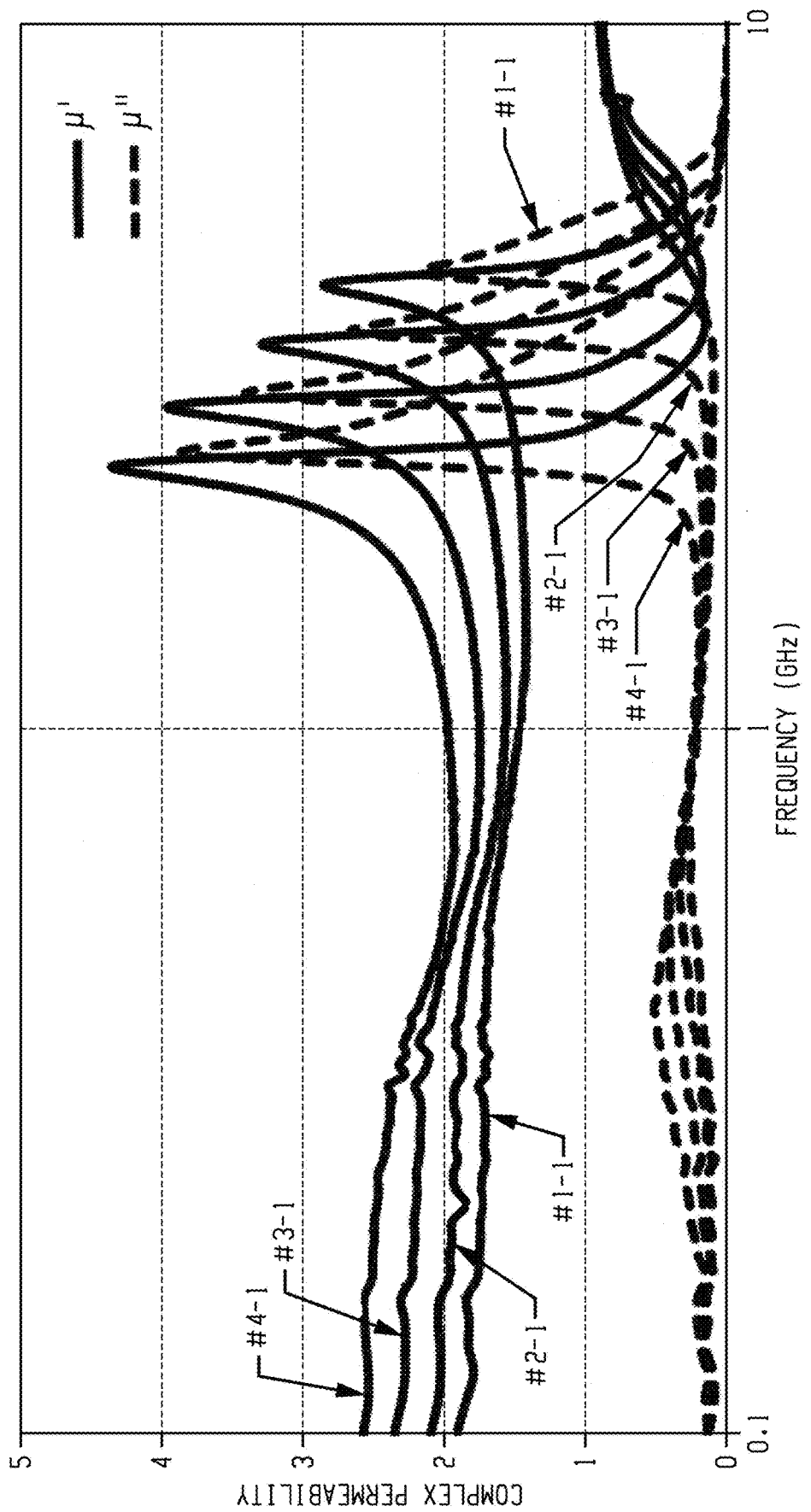
FIG. 3 presents permeability spectra for exemplary polycrystalline ferrites $Ba_5Mg_{2-x}Zn_xTi_3Fe_{12}O_{31}$ (x=0 (#1-1), 0.25 (#2-1), 0.5 (#3-1), and 0.7 (#4-1)) samples sintered at 1150 C for 4 hours in $O_2$.
Figure 4:
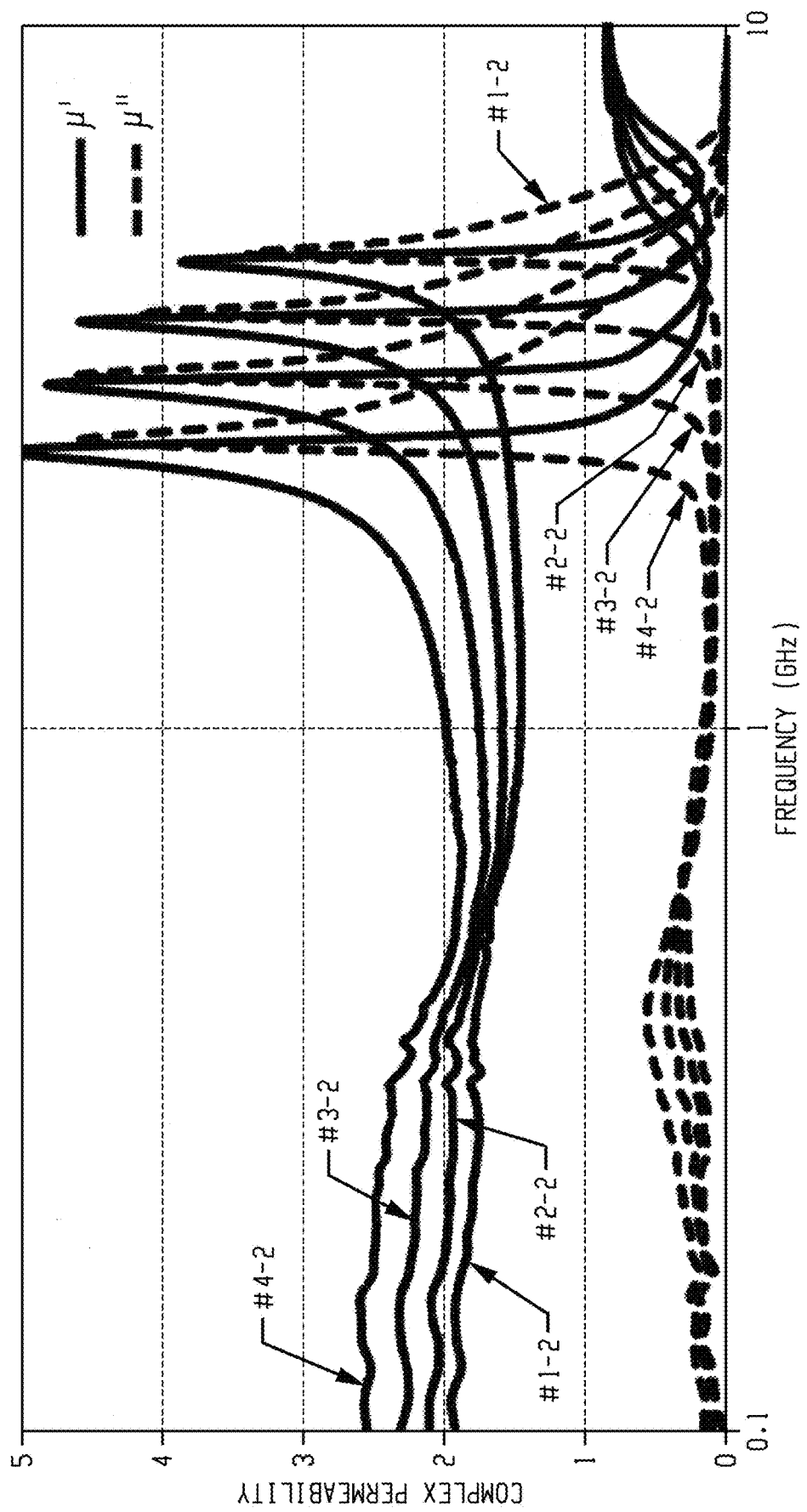
FIG. 4 presents permeability spectra for exemplary polycrystalline ferrites $Ba_5Mg_{2-x}Zn_xTi_3Fe_{12}O_{31}$ (x=0 (#1-2), 0.25 (#2-2), 0.5 (#3-2), and 0.7 (#4-2)) samples sintered at 1250 C for 4 hours in $O_2$.
Figure 5:
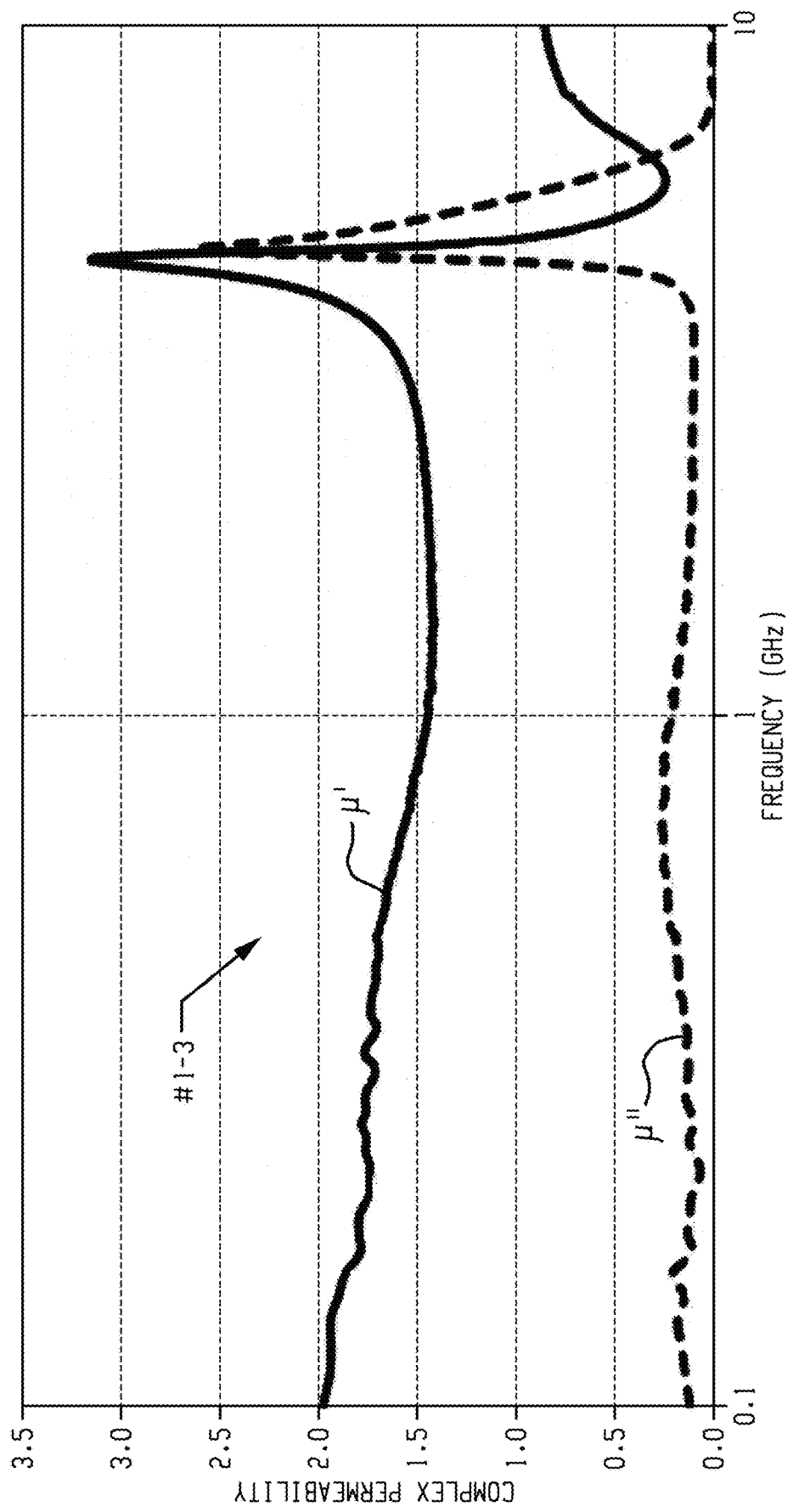
FIG. 5 presents permeability spectra for exemplary polycrystalline ferrites $Ba_5Mg_{2-x}Zn_xTi_3Fe_{12}O_{31}$ (x=0 (#1-3)) samples sintered at 1200 C for 4 hours in $O_2$.

FIG. 3 presents permeability spectra for $Ba_5Mg_{2-x}Zn_xTi_3Fe_{12}O_{31}$ (x=0 (#1-1), 0.25 (#2-1), 0.5 (#3-1), and 0.7 (#4-1)) samples sintered at 1150 C, while FIG. 4 presents the permeability spectra for $Ba_5Mg_{2-x}Zn_xTi_3Fe_{12}O_{31}$ (x=0 (#1-2), 0.25 (#2-2), 0.5 (#3-2), and 0.7 (#4-2)) samples sintered at 1250 C. Tables 3 and 4 below tabulate the permeability, cutoff frequency, and Snoek product at 1-3 GHz determined for each of these ferrite samples. FIG. 5 and Table 5 present the permeability spectrum and summary of the data for a sample $Ba_5Mg_{2-x}Zn_xTi_3Fe_{12}O_{31}$ (x=0 (#1-3)) sintered at 1200 C. The samples have demonstrated very low magnetic loss tangent (0.05-0.07), while permeability remains above 2, or 4 over a wide range of frequency from 1-4 GHz. Correspondingly, specific loss (also called loss factor) is in a range of 0.02-0.03. Magnetic loss, permeability, or cutoff frequency can be readily tailored by variation of the ratio of Mg to Zn ion to meet the needs of various applications.

TABLE 3

Permeability, cutoff frequency, and Snoek product at 1-3 GHz for ferrite samples, $BasMg_{2-x}Zn_xTi_3Fe_{12}O_{31}$ (x = 0, 0.25, 0.5, and 0.7) sintered at 1150 C. for 4 hrs in $O_2$. Snoek product = $\mu' \times f_r$.

| Sample | 1.0 GHz | | | 2.0 GHz | | | 3.0 GHz | | | $f_r$ (GHz) | Snoek product |
|---|---|---|---|---|---|---|---|---|---|---|---|
| | $\mu'$ | tan δ | tan δ/$\mu'$ | $\mu'$ | tan δ | tan δ/$\mu'$ | $\mu'$ | tan δ | tan δ/$\mu'$ | | |
| #1-1 | 1.48 | 0.16 | 0.11 | 1.45 | 0.08 | 0.06 | 1.58 | 0.06 | 0.04 | 4.4 | 8.4 |
| #2-1 | 1.58 | 0.14 | 0.09 | 1.67 | 0.08 | 0.05 | 2.11 | 0.09 | 0.04 | 3.7 | 7.8 |
| #3-1 | 1.76 | 0.13 | 0.08 | 2.04 | 0.08 | 0.04 | 2.33 | 1.46 | 0.63 | 3.0 | 7.2 |
| #4-1 | 1.99 | 0.12 | 0.06 | 2.78 | 0.11 | 0.04 | 0.56 | 3.23 | 5.74 | 2.5 | 6.5 |

TABLE 4

Permeability, cutoff frequency, and Snoek product for $Ba_5Mg_{2-x}Zn_xTi_3Fe_{12}O_{31}$ (x = 0, 0.25, 0.5, and 0.7) ferrite samples sintered at 1250 C. for 4 hrs in $O_2$ at 1-3 GHz. Snoek product =μ'x $f_r$.

| Sample No. | 1.0 GHZ | | | 2.0 GHz | | | 3.0 GHz | | | $f_r$ (GHz) | Snoek product |
|---|---|---|---|---|---|---|---|---|---|---|---|
| | μ' | tan δ | tan δ/μ' | μ' | tan δ | tan δ/μ' | μ' | tan δ | tan δ/μ' | | |
| #1-2 | 1.47 | 0.12 | 0.08 | 1.52 | 0.05 | 0.03 | 1.64 | 0.04 | 0.03 | 4.7 | 8.9 |
| #2-2 | 1.60 | 0.09 | 0.06 | 1.72 | 0.05 | 0.03 | 2.10 | 0.05 | 0.02 | 3.9 | 8.2 |
| #3-2 | 1.76 | 0.07 | 0.04 | 2.04 | 0.05 | 0.02 | 4.33 | 0.27 | 0.06 | 3.2 | 7.4 |
| #4-2 | 2.00 | 0.07 | 0.04 | 2.68 | 0.07 | 0.03 | 0.55 | 3.94 | 7.13 | 2.6 | 6.5 |

TABLE 5

Permeability, cutoff frequency, and Snoek product for $Ba_5Mg_{2-x}Zn_xTi_3Fe_{12}O_{31}$ (x = 0) ferrite samples sintered at 1200 C. for 4 hrs in $O_2$ at 2-4 GHz. Snoek product = u'x fr.

| Sample No. | 2.0 GHz | | | 3.0 GHz | | | 4.0 GHz | | | $f_r$ (GHz) | Snoek product |
|---|---|---|---|---|---|---|---|---|---|---|---|
| | μ' | tan δ | tan δ/μ' | μ' | tan δ | tan d/μ' | μ' | tan δ | tan δ/μ' | | |
| #1-3 | 1.44 | 0.08 | 0.06 | 1.52 | 0.07 | 0.05 | 1.91 | 0.07 | 0.04 | 4.8 | 9.6 |

Set forth below are non-limiting aspects of the present disclosure.

Aspect 1: A polycrystalline ferrite composition having a formula of $MsMe_2Ti_3Fe_{12}O_{31}$, wherein M is $Ba^{2+}$, $Sr^{2+}$, or a combination thereof, and Me is $Mg^{2+}$, $Zn^{2+}$, $Cu^{2+}$, $Co^{2+}$, or a combination thereof, and having an average grain size of 1 micrometer to 100 micrometers, preferably 5 micrometers to 50 micrometers.

Aspect 2: The polycrystalline ferrite composition of aspect 1, having a formula of $(Ba_{1-x}Sr_x)_5Mg_{2-y}Me'_yTi_3Fe_{12-z}O_{31}$, wherein Me' is $Zn^{2+}$, $Cu^{2+}$, $Co^{2+}$, or a combination thereof, X=0 to 1.5, Y=0 to 1.8, and Z=−4 to +4.

Aspect 3: The polycrystalline ferrite composition of aspect 2, wherein Y=0 to 1.0.

Aspect 4: The polycrystalline ferrite composition of aspect 2 or 3, wherein X=0.

Aspect 5: The polycrystalline ferrite composition of any one of the preceding aspects, having a magnetic permeability (μ) of at least 2 at a frequency of 1 to 4 GHz, preferably at least 5 at a frequency of 1 to 4 GHz; a magnetic loss tangent (tan $δ_μ$) of less than 0.05 at a frequency of 1 to 4 GHz, preferably of less than 0.02 at a frequency of 1 to 4 GHz, more preferably while retaining high permeability of at least 2 at the frequency; a permittivity (ε) of at least 13 to 16 at a frequency of 1 to 4 GHz, preferably at least 13 to 15 at a frequency of 1 to 4 GHz; a dielectric loss tangent (tan $δ_ε$) of less than 0.004 at a frequency of 1 to 4 GHz, preferably less than 0.003 at a frequency of 1 to 6 GHz; a magnetic loss factor (tan $δ_μ$/μ') less than 0.02 at a frequency of 1 to 4 GHz, or at a frequency of 2 to 6 GHz; a cutoff frequency (resonance frequency, $f_r$) greater than 4 GHz, preferably greater than 6 GHz; a Snoek product greater than 9 GHz, preferably greater than 12 GHz, wherein the Snoek product=u'x$f_r$; or a combination of the foregoing.

Aspect 6: The polycrystalline ferrite composition of any one of the preceding aspects having in-plane (basal c-plane) easy magnetization.

Aspect 7: The polycrystalline ferrite composition of any one of the preceding aspects that has an 18H structure.

Aspect 8: A method of manufacturing a polycrystalline ferrite composition comprising calcining blended metal source compounds for the polycrystalline ferrite composition of any one of aspects 1 to 7; reducing particle size of the calcined source compounds to obtain particles having an average particle size of 0.5 micrometer to 10 micrometers; granulating a mixture of the particles and a binder to obtain granules; compressing granules into a green body; and sintering the green body to form the polycrystalline ferrite composition.

Aspect 9: The method of aspect 8 wherein calcining is performed at 900 to 1200 C for 0.5 hour to 20 hours.

Aspect 10: The method of aspect 9 wherein calcining is performed in an atmosphere of air, nitrogen, oxygen, or a combination thereof.

Aspect 11: The method of any one of aspects 8 to 10 wherein sintering is performed at 1000 to 1300 C for 1 hour to 20 hours.

Aspect 12: The method of any one of aspects 8 to 11 wherein sintering is performed in an atmosphere of air, nitrogen, oxygen, or a combination thereof.

Aspect 13: The method of any one of aspects 8 to 12 wherein sintering is performed with a temperature heating rate of 1° C./minute to 5° C./min and/or with a cooling rate of 1° C./minute to 5° C./min.

Aspect 14: The method of any one of aspects 8 to 13 wherein reducing particle size comprises crushing and/or grinding the calcined source compounds.

Aspect 15: The method of any one of aspects 8 to 14 further comprising sizing the particles.

Aspect 16: The method of any one of aspects 8 to 15 further comprising blending the metal source compounds.

Aspect 17: The method of any one of aspects 8 to 16 wherein the binder is polyvinylpyrrolidone (PVP), poly (vinyl alcohol) (PVA), polyacrylamide (PAM), poly(acrylic acid) (PAA), polyethylene glycol (PEG), polyethylene oxide (PEO), cellulose acetate, starch, polypropylene carbonate, polyvinyl butyral (PVB), or a combination thereof, preferably the binder is PVA, PVB, or a combination thereof.

Aspect 18: A composite comprising: a polymer matrix; and the polycrystalline ferrite composition of any one of aspects 1 to 7, wherein the ferrite composition has a particle size of 0.5-30 μm, preferably 1-10 μm.

Aspect 19: The composite of aspect 18, comprising 5 to 95 volume percent of the polycrystalline hexaferrite, based on the total volume of the composite.

Aspect 20: The composite of any one of aspects 18 to 19, wherein the polymer matrix comprises a polycarbonate, a polystyrene, a polyphenylene ether, a polyimide (e.g., polyetherimide), a polybutadiene, a polyacrylonitrile, a poly (C1-12 alkyl)methacrylate (e.g., polymethylmethacrylate (PMMA)), a polyester (e.g., poly(ethylene terephthalate), poly(butylene terephthalate), or polythioester), a polyolefin (e.g., polypropylene (PP), high density polyethylene (HDPE), low density polyethylene (LDPE), or linear low density polyethylene (LLDPE)), a polyamide (e.g., polyamideimide), a polyarylate, a polysulfone (e.g., polyarylsulfone or polysulfonamide), a poly(phenylene sulfide), a poly(phenylene oxide), a polyethers (e.g., poly(ether ketone) (PEK), poly(ether ether ketone) (PEEK), polyethersulfone (PES)), a polyacrylic, a polyacetal, a polybenzoxazoles (e.g., polybenzothiazole or polybenzothiazinophenothiazine), a polyoxadiazole, a polypyrazinoquinoxaline, a polypyromellitimide, a polyquinoxaline, a polybenzimidazole, a polyoxindole, a polyoxoisoindoline (e.g., polydioxoisoindoline), a polytriazine, a polypyridazine, a polypiperazine, a polypyridine, a polypiperidine, a polytriazole, a polypyrazole, a polypyrrolidine, a polycarborane, a polyoxabicyclononane, a polydibenzofuran, a polyphthalide, a polyacetal, a polyanhydride, a vinyl polymer (e.g., a poly(vinyl ether), a poly(vinyl thioether), a poly(vinyl alcohol), a poly(vinyl ketone), a poly(vinyl halide) (such as polyvinylchloride), a poly(vinyl nitrile), or a poly(vinyl ester)), a polysulfonate, a polysulfide, a polyurea, a polyphosphazene, a polysilazane, a polysiloxane, a fluoropolymer (e.g., poly(vinyl fluoride) (PVF), poly(vinylidene fluoride) (PVDF), fluorinated ethylene-propylene (FEP), polytetrafluoroethylene (PTFE), or polyethylenetetrafluoroethylene (PETFE)), or a combination thereof, preferably, the polymer matrix comprises polyvinylidene fluoride (PVDF), polytetrafluoroethylene (PTFE), polyethylene (PE), high density polyethylene (HDPE), low density polyethylene (LDPE), polymethylmethacrylate (PMMA), polyether ether ketone (PEEK), polyethersulfone (PES), or a combination thereof.

Aspect 21: The composite of any one of aspects 18 to 20 having an operating frequency of 1 GHz to 10 GH; a magnetic permeability ($\mu$) of at least 1.5 at a frequency of 1 to 10 GHz; a magnetic loss tangent (tan $\delta_\mu$) of less than 0.02 at a frequency of 1 to 8 GHz; a permittivity ($\epsilon$) of 5 to 6 at a frequency of 1 to 10 GHz; a dielectric loss tangent (tan $\delta_\epsilon$) of less than 0.004 at a frequency of 1 to 10 GHz; a magnetic loss factor (tan $\delta_\mu/\mu'$) less than 0.01, or 0.008 at a frequency of 1 to 8 GHz, or at a frequency of 2 to 10 GHz; a cutoff frequency (resonance frequency, $f_r$) greater than 8 GHz, preferably greater than 10 GHz; or a combination of the foregoing.

Aspect 22: A method of making the composite of any one of aspects 18 to 21, the method comprising: combining a polymer, the polycrystalline ferrite composition, optionally a solvent, and optionally an additive composition to form the composite; and optionally removing the solvent from the composite.

Aspect 23: The method of aspect 22, further comprising shaping the composite.

Aspect 24: The method of aspect 23, wherein shaping the composite comprises compression molding, injection molding, reaction injection molding, extruding, rolling, casting, or impregnating or laminating onto a reinforcing medium.

Aspect 25: An article comprising the polycrystalline ferrite composition of any one of aspects 1-7 or made by the method of any one of aspects 8 to 17 or the composite of any one of aspects 18 to 21 or made by the method of any one of aspects 22 to 24.

Aspect 26: The article of aspect 25, wherein the article is an antenna, an inductor, a transformer, or an anti-electromagnetic interference material.

Aspect 27: The article of aspect 25 or 26, wherein the article is a microwave device.

In general, the compositions, methods, and articles can alternatively comprise, consist of, or consist essentially of, any ingredients, steps, or components herein disclosed. The compositions, methods, and articles can additionally, or alternatively, be formulated, conducted, or manufactured so as to be devoid, or substantially free, of any ingredients, steps, or components not necessary to the achievement of the function or objectives of the present claims.

The terms "a" and "an" do not denote a limitation of quantity, but rather denote the presence of at least one of the referenced item. The term "or" means "and/or" unless clearly indicated otherwise by context. The endpoints of all ranges directed to the same component or property are inclusive of the endpoints, are independently combinable, and include all intermediate points. Disclosure of a narrower range or more specific group in addition to a broader range is not a disclaimer of the broader range or larger group. A "combination thereof" is open and includes combinations of one or more of the named elements optionally together with one or more like element not named.

Unless defined otherwise, technical and scientific terms used herein have the same meaning as is commonly understood by one of skill in the art to which this disclosure belongs. The term "combination" is inclusive of blends, mixtures, alloys, reaction products, and the like. The permittivity and the permeability as used herein can be determined at a temperature of 23° C.

Reference throughout the specification to "an aspect", "some aspects", "an embodiment", and so forth, means that a particular element (e.g., feature, structure, step, or characteristic) described in connection with the aspect is included in at least one aspect described herein, and may or may not be present in other aspects. Thus, while certain combinations of features have been described, it will be appreciated that these combinations are for illustration purposes only and that any combination of any of these features can be employed, explicitly or equivalently, either individually or in combination with any other of the features disclosed herein, in any combination, and all in accordance with an aspect. Any and all such combinations are contemplated herein and are considered within the scope of the disclosure.

While the disclosure has been described with reference to exemplary aspects, it will be understood by those skilled in the art that various changes can be made and equivalents can be substituted for elements thereof without departing from the scope of this disclosure. In addition, many modifications can be made to adapt a particular situation or material to the teachings without departing from the essential scope thereof. Therefore, it is intended that the disclosure not be limited to the particular aspect disclosed as the best or only mode contemplated for carrying out this invention, but that the disclosure will include all aspects falling within the scope of the appended claims.

What is claimed is:

1. An article comprising a polycrystalline ferrite composition having a formula of $$M_5Mg_{2-y}Zn_yTi_3Fe_{12}O_{31},$$

wherein

M is $Ba^{2+}$, $Sr^{2+}$, or a combination thereof; and

Y=0.25 to 1.8, having an average grain size of 1 micrometer to 100 micrometers, wherein the article is an antenna, an inductor, a transformer, or an anti electromagnetic interference material.

2. An article comprising a polycrystalline ferrite composition, having a formula of

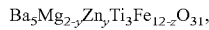

$$Ba_5Mg_{2-y}Zn_yTi_3Fe_{12-z}O_{31},$$

wherein

Y=0.25 to 1.8,

Z=−4 to +4, having an average grain size of 1 micrometer to 100 micrometers, and having a magnetic permeability (μ) of at least 2 at a frequency of 1 to 4 GHz, a magnetic loss tangent (tan $δ_μ$) of less than 0.05 at a frequency of 1 to 4 GHz, a permittivity (ε) of at least 13 to 16 at a frequency of 1 to 4 GHz, a dielectric loss tangent (tan $δ_ε$) of less than 0.004 at a frequency of 1 to 4 GHz, a magnetic loss factor (tan $δ_μ$/μ') less than 0.02 at a frequency of 1 to 4 GHz, a cutoff frequency (resonance frequency, $f_r$) greater than 4 GHz, a Snoek product greater than 9 GHz, wherein the Snoek product=u'×$f_r$, or a combination of the foregoing; and wherein the article is an antenna, an inductor, a transformer, or an anti-electromagnetic interference material.

3. The article of claim 2, wherein

Y=0.25 to 1.0.

4. The article of claim 1, wherein Y=0.25 to 1.0.

5. The article of claim 3, wherein the polycrystalline ferrite composition has a magnetic permeability (μ) of at least 5 at a frequency of 1 to 4 GHz;

a magnetic loss tangent (tan $δ_μ$) of less than 0.02 at a frequency of 1 to 4 GHz;

a permittivity (ε) of at least 13 to 15 at a frequency of 1 to 4 GHz;

a dielectric loss tangent (tan $δ_ε$) of less than 0.003 at a frequency of 1 to 4 GHz;

a cutoff frequency (resonance frequency, $f_r$) greater than 6 GHz;

a Snoek product greater than 12 GHz, wherein the Snoek product=u'×$f_r$; or a combination of the foregoing.

6. The article of claim 1, wherein the polycrystalline ferrite composition has in-plane easy magnetization and/or an 18H structure.

7. A method of manufacturing a polycrystalline ferrite composition comprising calcining blended metal source compounds for the polycrystalline ferrite composition as defined in claim 1;

reducing particle size of the calcined source compounds to obtain particles having an average particle size of 0.5 micrometer to 10 micrometers;

granulating a mixture of the particles and a binder to obtain granules;

compressing granules into a green body; and sintering the green body to form the polycrystalline ferrite composition.

8. The method of claim 7 wherein calcining is performed at 900 to 1200° C. for 0.5 hour to 20 hours.

9. The method of claim 8 wherein calcining is performed in an atmosphere of air, nitrogen, oxygen, or a combination thereof.

10. The method of claim 7 wherein sintering is performed at 1000 to 1300° C. for 1 hour to 20 hours.

11. The method of claim 7 wherein sintering is performed in an atmosphere of air, nitrogen, oxygen, or a combination thereof.

12. The method of claim 7 wherein sintering is performed with a temperature heating rate of 1° C./minute to 5° C./min and/or with a cooling rate of 1° C./minute to 5° C./minute.

13. The method of claim 7 wherein reducing particle size comprises crushing and/or grinding the calcined source compounds.

14. The method of claim 7 further comprising sizing the particles.

15. The method of claim 7 further comprising blending the metal source compounds.

16. The method of claim 7 wherein the binder is polyvinylpyrrolidone (PVP), poly(vinyl alcohol) (PVA), polyacrylamide (PAM), poly(acrylic acid) (PAA), polyethylene glycol (PEG), polyethylene oxide (PEO), cellulose acetate, starch, polypropylene carbonate, polyvinyl butyral (PVB), or a combination thereof.

17. The article of claim 1, wherein the article comprises a composite comprising:

a polymer matrix; and the polycrystalline ferrite composition as defined in claim 1, wherein the ferrite composition has a particle size of 0.5 micrometer to 30 micrometers.

18. The article of claim 17, wherein the composite comprises 5 to 95 volume percent of the polycrystalline hexaferrite, based on the total volume of the composite.

19. The article of claim 17, wherein the polymer matrix comprises polyvinylidene fluoride (PVDF), polytetrafluoroethylene (PTFE), polyethylene (PE), high density polyethylene (HDPE), low density polyethylene (LDPE), polymethylmethacrylate (PMMA), polyether ether ketone (PEEK), polyethersulfone (PES), or a combination thereof.

20. The article of claim 17, wherein the composite has an operating frequency of 1 GHz to 10 GH;

a magnetic permeability (μ) of at least 1.5 at a frequency of 1 to 10 GHz;

a magnetic loss tangent (tan $δ_μ$) of less than 0.02 at a frequency of 1 to 8 GHz;

a permittivity (ε) of 5 to 6 at a frequency of 1 to 10 GHz;

a dielectric loss tangent (tan $δ_ε$) of less than 0.004 at a frequency of 1 to 10 GHz;

a magnetic loss factor (tan $δ_μ$/μ') less than 0.01, or 0.008 at a frequency of 1 to 10 GHz;

a cutoff frequency (resonance frequency, $f_r$) greater than 8 GHz; or a combination of the foregoing.

21. A method of making the composite as defined in claim 17, the method comprising:

combining a polymer, the polycrystalline ferrite composition, optionally a solvent, and optionally an additive composition to form a composite; and optionally removing the solvent from the composite.

22. The method of claim 21, wherein the forming comprises shaping the composite.

23. The method of claim 22, wherein shaping the composite comprises compression molding, injection molding, reaction injection molding, extruding, rolling, casting, or impregnating or laminating onto a reinforcing medium.

24. An article comprising a polycrystalline ferrite composition made by the method of claim 7.

25. The article of claim 1, wherein the article is an antenna.

* * * * *